United States Patent [19]

Horimoto

[11] 4,412,726
[45] Nov. 1, 1983

[54] FISH EYE LENS SYSTEM

[75] Inventor: Mitsuaki Horimoto, Sennan, Japan

[73] Assignee: Minolta Camera Kabushiki Kaisha, Higashi, Japan

[21] Appl. No.: 224,791

[22] Filed: Jan. 13, 1981

[30] Foreign Application Priority Data

Jan. 17, 1980 [JP] Japan .................. 55-4406

[51] Int. Cl.³ .................. G02B 9/60; G02B 9/62
[52] U.S. Cl. .................. 350/461; 350/439; 350/462
[58] Field of Search .......... 350/439, 458–461, 350/462

[56] References Cited

U.S. PATENT DOCUMENTS

| 3,734,600 | 5/1973 | Shimizu | 350/439 |
| 4,009,943 | 3/1977 | Horimoto | 350/439 |
| 4,256,373 | 3/1981 | Horimoto | 350/463 |
| 4,291,951 | 9/1981 | Ikemori | 350/458 |

FOREIGN PATENT DOCUMENTS 54-32319  3/1979  Japan .................. 350/460

*Primary Examiner*—John K. Corbin
*Assistant Examiner*—Rebecca D. Gass
*Attorney, Agent, or Firm*—Jackson, Jones & Price

[57] ABSTRACT

An improved compact high-speed fish eye lens system with minimal saggital flare is provided. The lens system comprises a front lens group having a pair of negative meniscus lens elements convex to the object side, an intermediate lens group having a pair of positive lens elements and a negative lens element, a rear lens group having a pair of doublets, the object side one of which includes an intermediate cemented surface having a positive refractive power. The radius of curvature, R, of the intermediate cemented surface of the object side doublet fulfills the following conditions wherein f represents the focal length of the whole lens system:

$$f < R < 3f$$

15 Claims, 20 Drawing Figures

Spherical Aberration

Astigmatism

Distortion

Spherical Aberration

Astigmatism

Distortion

Spherical Aberration

Astigmatism

Distortion

Spherical Aberration

Astigmatism

Distortion

Spherical Aberration

Astigmatism

Distortion

FISH EYE LENS SYSTEM

BACKGROUND OF THE INVENTION

1. Field of the Invention

The present invention relates to a fish eye lens system having an extreme wide field angle reaching 180 degrees, and more particularly to a fish eye lens system having both high speed and a compact size.

2. Description of the Prior Art

In the field of photography, there have been known various types of fish eye lens systems for 35 millimeter SLR cameras, such as disclosed in U.S. Pat. Nos. 3,734,600, 4,009,943, and Japanese Patent Application Laid-Open No. 54-32319 on Mar. 9, 1979.

A fish eye lens system for use in 35 mm SLR cameras generally has a front lens group of a far greater negative refractive power than that of an ordinary inverted telephoto type wide angle lens system since a fairly large back focal distance, relative to the focal length of the whole lens system, is required for avoiding an increase in size of the lens system. This extreme power distribution is apt to cause field curvature and astigmatism in the transmitted image. In addition, sagittal flare including Rinnen fehler is also increased if a high speed such as F/2.8 is desired.

To improve the field curvature and astigmatism, it is basically necessary to avoid any negative deviation of the Petzval sum to the greatest extent possible. In the prior art, this has been generally attempted by providing, at the image side of the aperture stop, at least one doublet composed of a positive lens element of a low-refractive-index-low-dispersion glass and a negative lens element of a high-refractive-index-high-dispersion glass with a cemented intermediate surface of a suitable negative refractive power formed therebetween. This approach helps avoid significant negative deviation of the Petzval sum plus also permitting correction of chromatic aberration.

The conventional lens design has taught that an additional one or more doublet, similar to the above-mentioned doublet, should be further provided on the image side of the aperture stop, alternatively the difference in the refractive index on the opposite sides of the cemented surface of the above-mentioned doublet could be increased if a still greater increase of negative refractive power in the front lens group is desired for making the lens system even further compact. The conventional lens design has also suggested forming the negative lens elements in the front lens group out of a glass of as high refractive index as possible to also reduce the size of the lens system.

With respect to the previously mentioned sagittal flare which includes Rinnen fehler, the conventional lens design for an extremely wide angle high speed lens system has permitted this aberration to remain if the desire for compactness is a preferred design criterion. This is because of the following reasons. The sagittal flare is generally a typical and fatal aberration to a lens system of high speed, and is more particularly remarkable in a case of a Gauss type lens system or an inverted telephoto type wide angle lens system. For correcting this aberration, it may be recommended to avoid locating a refracting surface having a short negative radius of curvature at a position in which an off axial light pencil passes the surface apart from the optical axis. An example of such a design technique for this purpose would be to use a glass of high refractive index for increasing the radius of curvature as much as possible. However, in case of an extremely wide angle lens system of a compact size having a field angle greater than 72 degrees and a high speed greater than F/2.8, the degree of freedom in designing the lens system is greatly restricted and a practical way to sufficiently correct the sagittal flare is still a design goal. Thus, the sagittal flare has been generally permitted to remain to some degree, and it has been excused on the basis that the remaining sagittal flare can vanish if the aperture stop is stopped down to a size with which photography is most frequently practised.

The prior art is still seeking a compact fish eye lens with minimal sagittal flare.

SUMMARY OF THE INVENTION

An object of the present invention is to provide a compact and high speed fish eye lens system having a front lens group of a relatively great negative refractive power in which the sagittal flare, including Rinnen fehler, as well as the field curvature and the astigmatism is sufficiently corrected.

Another object of the present invention is to provide the above fish eye lens system in a compact design expressed by the following conditions:

$2.7 < \Sigma d/f < 3.1$
$2.4 < D_1/f < 2.7$ wherein:
- $\Sigma d$ represents the total length of the whole lens system;
- $D_1$ represents the diameter of the clear aperture of the front lens element of the lens system, and
- $f$ represents the focal length of the whole lens system.

Each of the embodiments of the fish eye lens system of the present invention comprises a front lens group consisting of a pair of negative meniscus lens elements, both convex to the object side, an intermediate lens group consisting of a pair of positive lens elements and a negative lens element and a rear lens group consisting of a pair of doublets, the object side of one doublet includes an intermediate cemented surface having a positive refractive power.

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings.

DETAILED DESCRIPTION OF THE PREFERRED EMBODIMENTS

Figure 1:
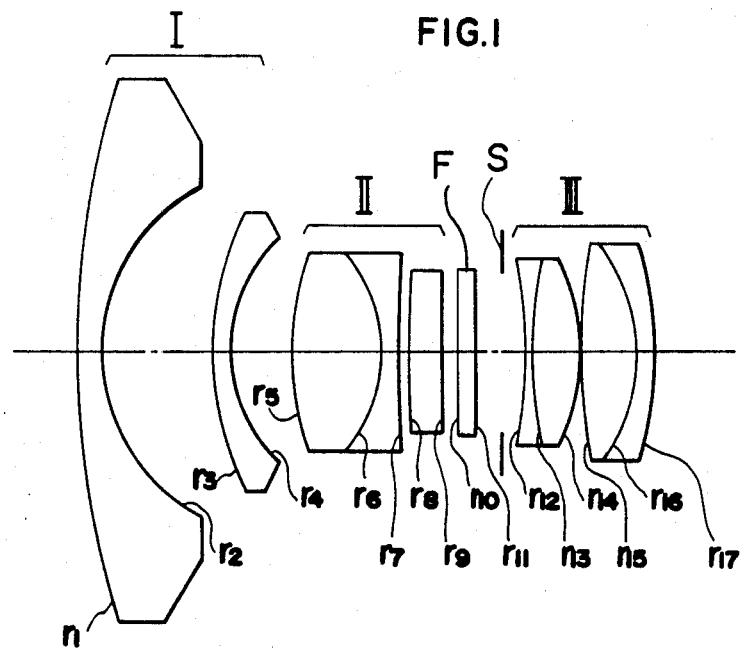
FIG. 1 represents a schematic view of a first embodiment of the present invention.

The following description is provided to enable any person skilled in the optical art to make and use the invention and sets forth the best modes contemplated by the inventor for carrying out his invention. Various modifications, however, will remain readily apparent to those skilled in the art, since the generic principles of the present invention have been defined specifically to provide an improved compact high-speed fish eye lens system.

The derivation of the formula and the relationship set forth herein can be accomplished with the assistance of a computer. The present invention represents the parameters of a compromise balance of acceptable aberrations in a relatively easily manufactured and low-cost compact lens system for utilization, for example, with a single lens reflex camera.

In each of the schematic cross sectional views in the figures, the lens groups have been designated by a Roman numeral to simply establish the first, second and third lens groups that are traditionally associated with the design of a fish eye lens system.

The improved compact fish eye lens system of the present invention provides an optimized optical lens design with a choice of certain parameters set forth herein to solve the problems of spherical and lateral chromatic aberrations, distortion, and astigmatism experienced with a field angle of 180 degrees. The present invention is particularly designed to remove the problems of sagittal flare that have been traditionally experienced with fish eye lens systems, particularly of a compact configuration.

Each of the embodiments of the present invention provide an aperture ratio of F/2.8 and a back focal length of slightly greater than two times the focal length of the system. Further, each of the embodiments are particularly adapted for use on a compact 35 mm. SLR camera.

With reference to the schematic cross sectional views of the embodiments of the present invention, it can be seen that a minimal number of lenses are utilized to accomplish the purpose of the present invention to thereby ensure a lightweight compact lens design. The lenses are further designated in groups with a first lens group, I and a second lens group, II, positioned on the object side of a diaphragm while a third lens group, III, is positioned on the image side of a diaphragm. As can be seen from the figures, a filter element can be positioned in the lens system, such as before the diaphragm and can be either statically positioned or capable of being optionally changed, as desired.

The Tables subsequently provided herein will establish the particular dimensions and parameters of the individual lens elements that make up each of the improved fish eye lens systems in such a manner that anyone skilled in the optical arts can reproduce the invention. These Tables, however, should not be construed as limiting to the generic design principles that are disclosed herein.

In the accompanying drawings which supplement the Tables, the lenses, in accordance with the present invention, are illustrated diagrammatically with light assumed to travel from left to right. The radii of curvature of the lenses are indicated by, r, with a subscript corresponding to the consecutive numbers of the lens element surfaces. The axial spacings, d, along the optical axis include both the axial spacings between the lens elements and the thickness of the lens elements, again with a subscript indicating a spatial position in the lens system. The minus signs indicate surfaces concave toward the object side, while the surfaces without the sign are convex toward the object side. All linear dimensions are given in absolute values and are given with reference to the equivalent focal length of unity. The Tables also provide, with respect to each example, the intended relative aperture, the total angle of view, $2\omega$, the back focus or back focal length with reference to an object at infinity, the refractive index and the Abbe number.

As is apparent from FIGS. 1, 3, 5, 7 and 9, the fish eye lens system of the present invention comprises a front lens group (I) consisting of a pair of negative meniscus lens elements both convex to the object side, an intermediate lens group (II) consisting of a pair of positive lens elements and a negative lens element, and a rear lens group (III) consisting of a pair of doublets, the object side one of which includes an intermediate cemented surface ($r_{13}$ in FIGS. 1, 5 and 9; or $r_{12}$ in FIGS. 3 and 7) having a positive refractive power $\Phi$. According to the present invention, the radius of curvature R of the intermediate cemented surface of the object side doublet in the rear lens group further fulfills the following condition if f represents the focal length of the whole lens system:

$f < R < 3f$

As shown in the drawings, the lens system according to the present invention further comprises an aperture stop (S) and an exchangeable filter (F) both located between the intermediate and rear lens groups.

Figure 5:
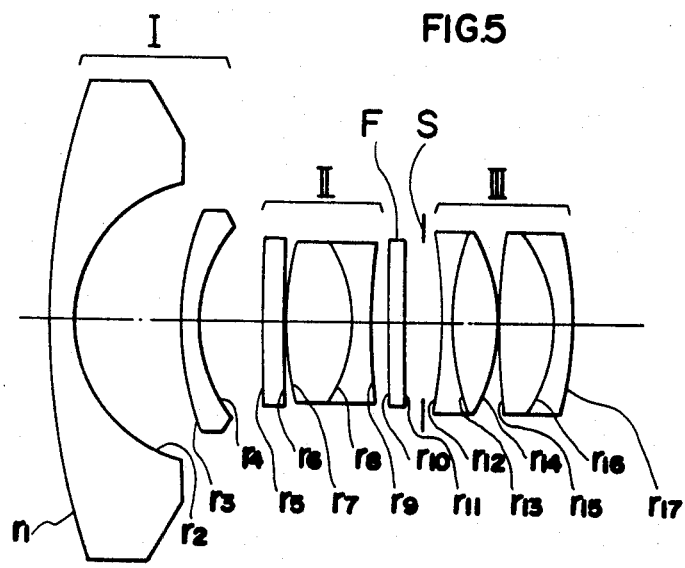
FIG. 5 represents a schematic view of a third embodiment of the present invention.
Figure 6A:
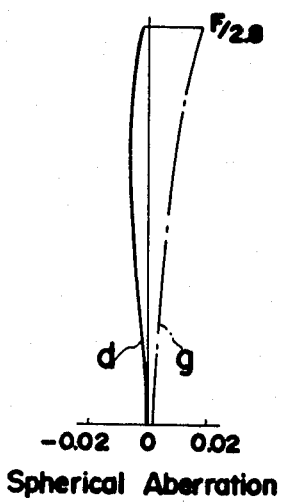
FIGS. 6a, 6b and 6c represent graphic plots of the various aberrations of the third embodiment.
Figure 6B:
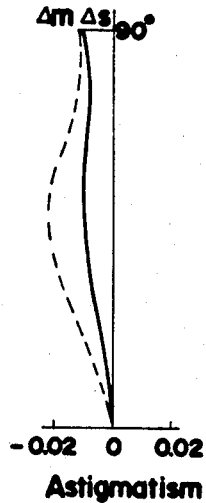
Figure 6C:
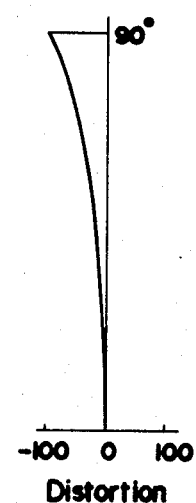
Figure 7:
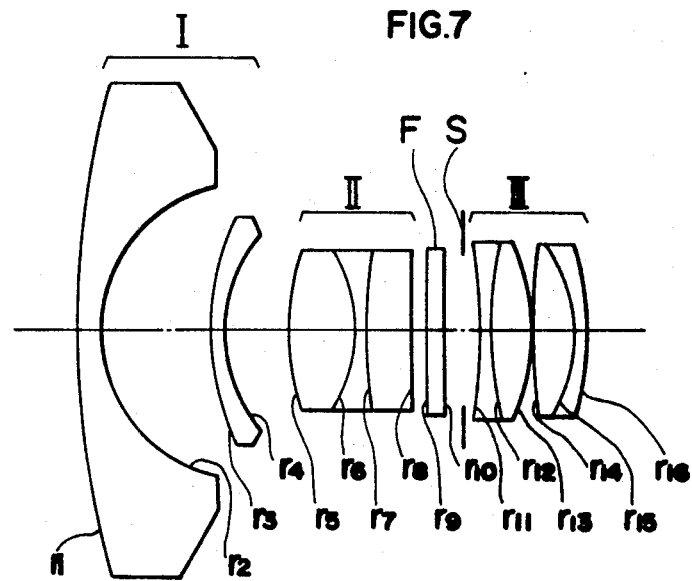
FIG. 7 represents a schematic view of a fourth embodiment of the present invention.
Figure 8A:
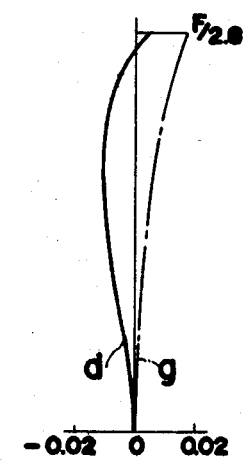
FIGS. 8a, 8b and 8c represent graphic plots of the various aberrations of the fourth embodiment.
Figure 8B:
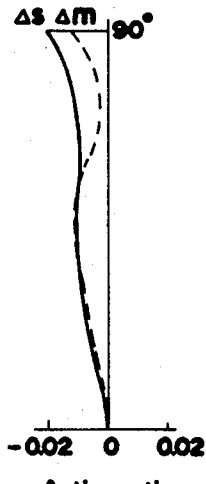
Figure 8C:
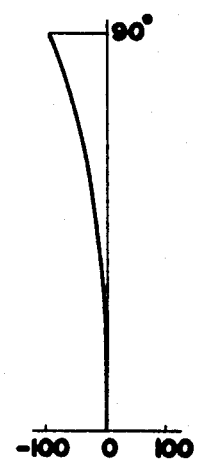
Figure 9:
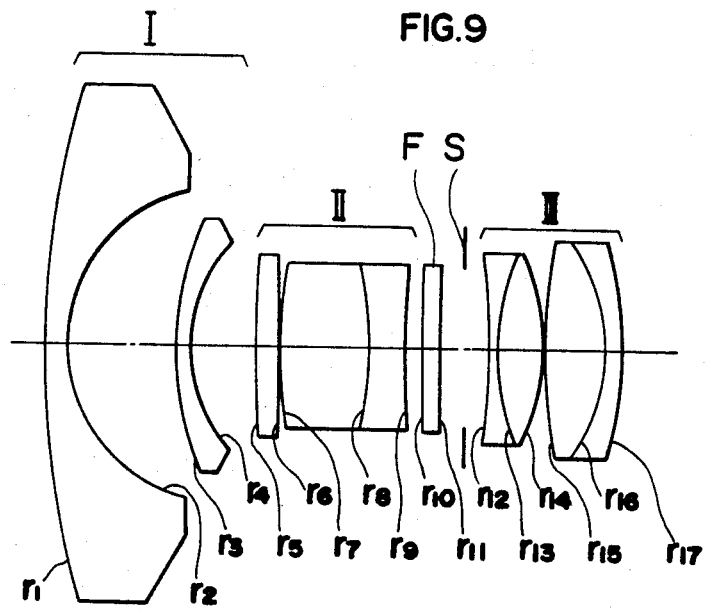
FIG. 9 represents a schematic view of a fifth embodiment of the present invention.
Figure 10A:
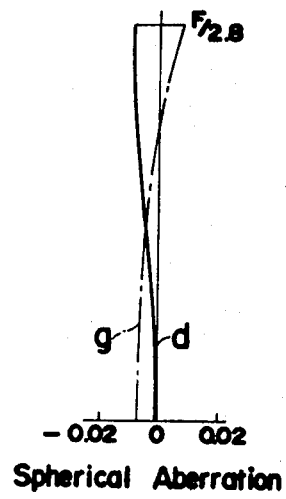
FIGS. 10a, 10b and 10c represent graphic plots of the various aberrations of the fifth embodiment.
Figure 10B:
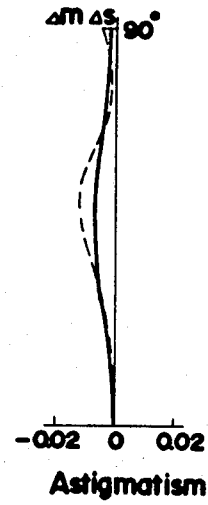
Figure 10C:
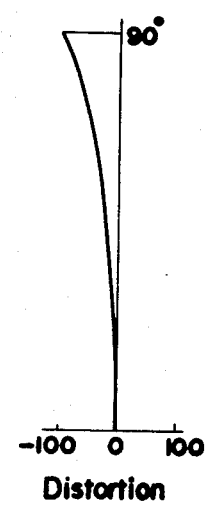

In some of the embodiments of the present invention as in FIGS. 1, 5 and 9, one of the pair of positive lens elements is cemented to the negative lens element in the intermediate lens group (II), the other of the pair of positive lens elements being located at the image side of the cemented lens elements such as in the case of the FIG. 1 embodiment, while at the object side of the cemented lens elements in case of the embodiment in FIGS. 5 or 9. All of the three lens elements are cemented together in the intermediate lens group (II) in case of the embodiments in FIGS. 3 and 7.

As already mentioned, a fish eye lens system for 35 mm. SLR cameras generally requires a fairly great back focal distance relative to the focal length of the whole lens system to allow the reflex mirror to flip up and down freely. The fish eye lens system according to the present invention also has a back focal distance greater than the focal length of the whole lens system.

With respect to the front lens group (I) of the present invention, a pair of negative meniscus lens elements both convex to the object side are designed to create a relatively great negative refractive power as defined within the following range:

$2.7 < |f_I|/f < 3.1$ wherein, $f_I$ represents the focal length of the front lens group. For creating such a great negative refractive power, a front lens group consisting of three or more lens elements would be generally favorable for aberration correction. According to the present invention, however, a pair of negative lens elements, which correspond to an expediently simple lens construction for the front lens group, is successfully combined with the intermediate and rear lens groups of the present invention to permit the inventive design to be compact in size and low in cost.

The intermediate lens group (II) includes at least one cemented surface between a negative lens element of low dispersion and a positive lens element of high dispersion cemented thereto for correcting lateral chromatic aberration in cooperation with the cemented surface of the image side doublet in the rear lens group (III). The refractive power of the cemented surface in the intermediate lens group (II) is negative for correcting field curvature and astigmatism. The other one of the pair of positive lens elements in the intermediate lens group (II) is located apart from the doublet to form an air space therebetween as in FIGS. 1, 5 and 9 or can be further cemented to the doublet to form a second cemented surface therebetween as in FIGS. 3 and 7. This air space, or the second cemented surface, has a positive refractive power for mainly correcting the negative coma caused by the first lens group (I) and the first mentioned cemented surface in the intermediate lens group (II), and additionally for reducing sagittal flare including Rinnen fehler. The refractive power of the whole intermediate lens group (II) is recommended to be within the following range:

$2.6 < f_{II}/f < 3.1$ wherein, $f_{II}$ represents the focal length of the whole second lens group (II).

With respect to the rear lens group (III), the object side doublet functions to remove sagittal flare including Rinnen fehler. On the contrary, the image side doublet in the rear lens group (III) is used for avoiding any negative deviation of the Petzval sum and for further correcting chromatic aberration by means of a combination of a positive lens element of a low-refractive-index-low-dispersion glass and a negative lens element of a high-refractive-index-high-dispersion glass cemented thereto as in a conventional fish eye lens system.

For the cemented surface in the doublet next to the aperture stop at the image side thereof, the conventional lens design approach has only required achromatization by setting the refractive indices of the glass on the opposite sides of the cemented surface equal to each other, or it has been used for correcting the Petzval sum in addition to the achromatization by setting the refractive power of the cemented surface negative. This lens design concept has been thought preferable in designing fish eye lens systems since this design approach is also favorable to the correction of the field curvature and astigmatism.

In contrast thereto, the present invention has adopted a doublet having a cemented surface of positive refractive power next to the aperture stop at the image side thereof. This novel concept of design achieves a satisfactory correction of sagittal flare, including Rinnen fehler, and coma from zonal to marginal areas, which have been traditionally left within the design parameters of compact high speed fish eye lens systems such as lens systems of F/2.8 in the prior art.

According to the present invention, the radius of curvature R of the cemented surface of the doublet next to the aperture stop, on the image side thereof, is further required to be within the range from f to 3f as already mentioned. If R is greater than 3f, positive coma and sagittal flare would be intolerably increased. On the other hand, a generation of negative coma and a negative deviation of Petzval sum would be caused, in designing a practical high speed fish eye lens system such as F/2.8, if R is less than f.

Figure 2A:
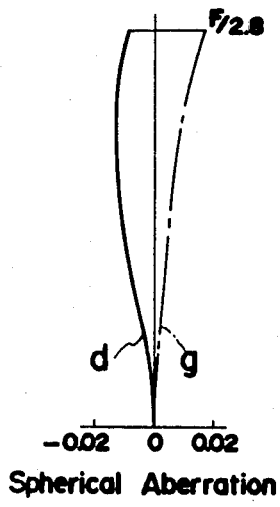
FIGS. 2a, 2b and 2c represent graphic plots of the various aberrations of the first embodiment.
Figure 2B:
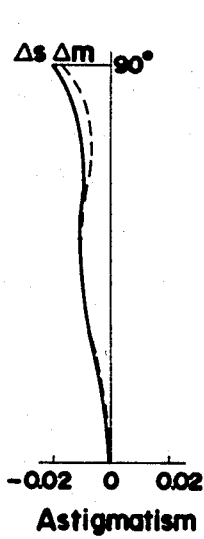
Figure 2C:
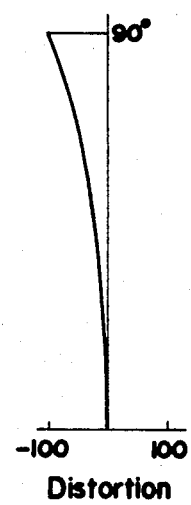
Figure 3:
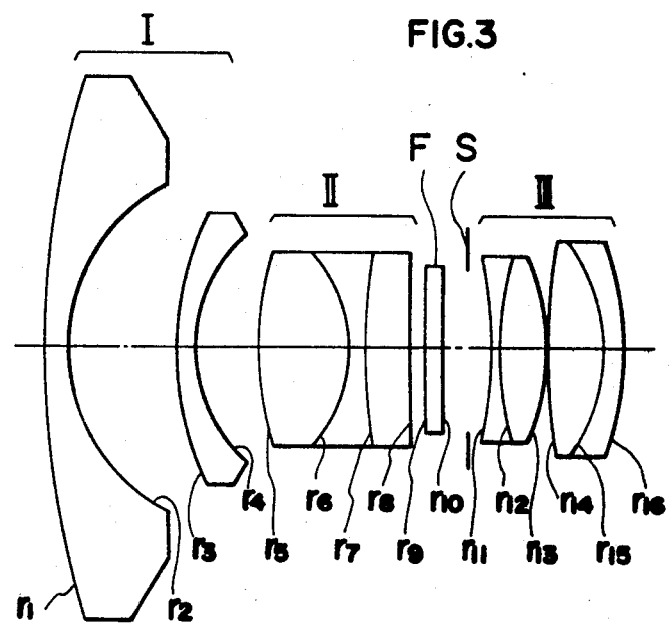
FIG. 3 represents a schematic view of a second embodiment of the present invention.
Figure 4A:
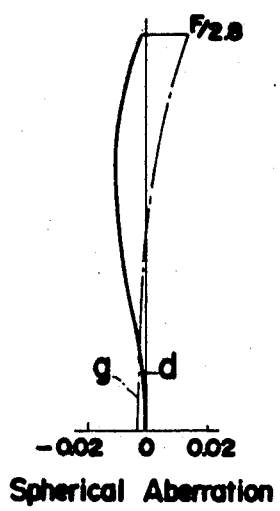
FIGS. 4a, 4b and 4c represent graphic plots of the various aberrations of the second embodiment.
Figure 4B:
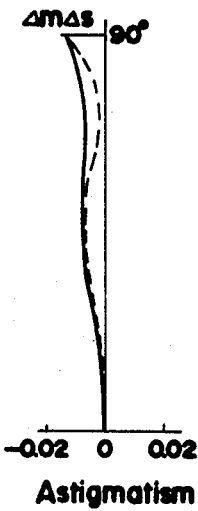
Figure 4C:
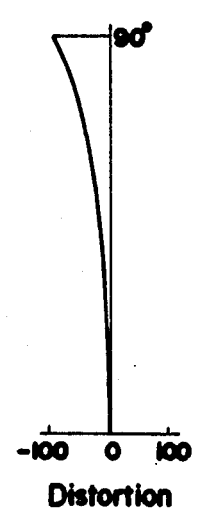

Each of the following Tables, set forth herein, are described relative to a specific embodiment of the invention and relate directly to a figure. For example, Table 1 relates to Embodiment 1 and FIG. 1, with the spherical aberrations being set forth in FIG. 2a, the astigmatism in 2b, and distortion in 2c. Likewise, FIG. 3 relates to Embodiment 2 as set forth in Table 2. Correspondingly, the aberrations of Embodiment 2 are set forth in FIGS. 4a, 4b and 4c. The other Tables, Embodiments and Figures are likewise related in sequential order.

TABLE 1

[Embodiment 1]
$f = 1$, F/2.8, $2\omega = 180°$, back focal distance 2.324

| Radius of Curvature | | Axial Distance | Refractive Index | | Abbe Number | |
|---|---|---|---|---|---|---|
| $r_1$ | 4.7745 | | | | | |
| | | $d_1$ | 0.1299 | $N_1$ | 1.71300 | $\nu_1$ 53.93 |
| $r_2$ | 0.8821 | | | | | |
| | | $d_2$ | 0.5688 | | | |
| $r_3$ | 1.6822 | | | | | |
| | | $d_3$ | 0.0938 | $N_2$ | 1.61800 | $\nu_2$ 63.38 |
| $r_4$ | 0.8064 | | | | | |
| | | $d_4$ | 0.3313 | | | |
| $r_5$ | 1.6265 | | | | | |
| | | $d_5$ | 0.4838 | $N_3$ | 1.59551 | $\nu_3$ 39.23 |
| $r_6$ | −0.7284 | | | | | |
| | | $d_6$ | 0.0969 | $N_4$ | 1.62280 | $\nu_4$ 56.98 |
| $r_7$ | 8.3331 | | | | | |
| | | $d_7$ | 0.0500 | | | |
| $r_8$ | 7.6334 | | | | | |
| | | $d_8$ | 0.1875 | $N_5$ | 1.80500 | $\nu_5$ 40.97 |
| $r_9$ | ∞ | | | | | |
| | | $d_9$ | 0.0806 | | | |
| $r_{10}$ | ∞ (filter) | | | | | |
| | | $d_{10}$ | 0.0938 | $N_6$ | 1.58100 | $\nu_6$ 41.00 |
| $r_{11}$ | ∞ | | | | | |
| | | $d_{11}$ | 0.2413 | | | |
| $r_{12}$ | −2.8724 | | | | | |
| | | $d_{12}$ | 0.0500 | $N_7$ | 1.59270 | $\nu_7$ 35.29 |
| $r_{13}$ | 2.8034 | | | | | |
| | | $d_{13}$ | 0.2500 | $N_8$ | 1.64050 | $\nu_8$ 60.08 |
| $r_{14}$ | −1.1513 | | | | | |
| | | $d_{14}$ | 0.0063 | | | |
| $r_{15}$ | 3.2583 | | | | | |
| | | $d_{15}$ | 0.2919 | $N_9$ | 1.48749 | $\nu_9$ 70.15 |
| $r_{16}$ | −0.8827 | | | | | |
| | | $d_{16}$ | 0.0913 | $N_{10}$ | 1.80518 | $\nu_{10}$ 25.43 |
| $r_{17}$ | −1.7116 | | | | | |
| | | $\Sigma d = 3.0468$ | | | | |

TABLE 2

[Embodiment 2]
$f = 1$, F/2.8, $2\omega = 180°$, back focal distance 2.294

| Radius of Curvature | | Axial Distance | Refractive Index | | Abbe Number | |
|---|---|---|---|---|---|---|
| $r_1$ | 4.7740 | | | | | |
| | | $d_1$ | 0.1299 | $N_1$ | 1.71300 | $\nu_1$ 53.93 |
| $r_2$ | 0.8708 | | | | | |
| | | $d_2$ | 0.5688 | | | |
| $r_3$ | 1.6372 | | | | | |
| | | $d_3$ | 0.0938 | $N_2$ | 1.61800 | $\nu_2$ 63.38 |
| $r_4$ | 0.8034 | | | | | |
| | | $d_4$ | 0.3313 | | | |
| $r_5$ | 1.5933 | | | | | |
| | | $d_5$ | 0.4838 | $N_3$ | 1.59551 | $\nu_3$ 39.23 |
| $r_6$ | −0.7261 | | | | | |
| | | $d_6$ | 0.0969 | $N_4$ | 1.62280 | $\nu_4$ 56.98 |
| $r_7$ | 8.5127 | | | | | |
| | | $d_7$ | 0.2375 | $N_5$ | 1.80500 | $\nu_5$ 40.97 |
| $r_8$ | ∞ | | | | | |
| | | $d_8$ | 0.0806 | | | |
| $r_9$ | ∞ (filter) | | | | | |
| | | $d_9$ | 0.0938 | $N_6$ | 1.58100 | $\nu_6$ 41.00 |

TABLE 2-continued

[Embodiment 2]
f = 1, F/2.8, 2ω = 180°, back focal distance 2.294

| Radius of Curvature | | Axial Distance | | Refractive Index | | Abbe Number |
|---|---|---|---|---|---|---|
| $r_{10}$ | ∞ | | | | | |
| | | $d_{10}$ | 0.2413 | | | |
| $r_{11}$ | −2.8722 | | | | | |
| | | $d_{11}$ | 0.0500 | $N_7$ 1.59551 | $\nu_7$ | 39.23 |
| $r_{12}$ | 1.9923 | | | | | |
| | | $d_{12}$ | 0.2500 | $N_8$ 1.65160 | $\nu_8$ | 58.60 |
| $r_{13}$ | −1.1462 | | | | | |
| | | $d_{13}$ | 0.0063 | | | |
| $r_{14}$ | 3.3004 | | | | | |
| | | $d_{14}$ | 0.2919 | $N_9$ 1.48749 | $\nu_9$ | 70.15 |
| $r_{15}$ | −0.8687 | | | | | |
| | | $d_{15}$ | 0.0913 | $N_{10}$ 1.80518 | $\nu_{10}$ | 25.43 |
| $r_{16}$ | −1.7332 | | | | | |
| | | | Σd = 3.0468 | | | |

TABLE 3

[Embodiment 3]
f = 1, F/2.8, 2ω = 180°, back focal distance 2.213

| Radius of Curvature | | Axial Distance | | Refractive Index | | Abbe Number |
|---|---|---|---|---|---|---|
| $r_1$ | 4.1421 | | | | | |
| | | $d_1$ | 0.1299 | $N_1$ 1.71300 | $\nu_1$ | 53.93 |
| $r_2$ | 0.7439 | | | | | |
| | | $d_2$ | 0.5688 | | | |
| $r_3$ | 1.4389 | | | | | |
| | | $d_3$ | 0.0938 | $N_2$ 1.61800 | $\nu_2$ | 63.38 |
| $r_4$ | 0.7998 | | | | | |
| | | $d_4$ | 0.3313 | | | |
| $r_5$ | 7.0679 | | | | | |
| | | $d_5$ | 0.1250 | $N_3$ 1.80500 | $\nu_3$ | 40.97 |
| $r_6$ | ∞ | | | | | |
| | | $d_6$ | 0.0063 | | | |
| $r_7$ | 1.5149 | | | | | |
| | | $d_7$ | 0.3588 | $N_4$ 1.59551 | $\nu_4$ | 39.23 |
| $r_8$ | −0.7304 | | | | | |
| | | $d_8$ | 0.0969 | $N_5$ 1.62280 | $\nu_5$ | 56.98 |
| $r_9$ | 4.4030 | | | | | |
| | | $d_9$ | 0.0806 | | | |
| $r_{10}$ | ∞ (filter) | | | | | |
| | | $d_{10}$ | 0.0938 | $N_6$ 1.58100 | $\nu_6$ | 41.00 |
| $r_{11}$ | ∞ | | | | | |
| | | $d_{11}$ | 0.1875 | | | |
| $r_{12}$ | −3.5894 | | | | | |
| | | $d_{12}$ | 0.0500 | $N_7$ 1.58144 | $\nu_7$ | 40.83 |
| $r_{13}$ | 1.2959 | | | | | |
| | | $d_{13}$ | 0.2500 | $N_8$ 1.63854 | $\nu_8$ | 55.62 |
| $r_{14}$ | −1.0011 | | | | | |
| | | $d_{14}$ | 0.0063 | | | |
| $r_{15}$ | 3.1647 | | | | | |
| | | $d_{15}$ | 0.2919 | $N_9$ 1.48749 | $\nu_9$ | 70.15 |
| $r_{16}$ | −0.7778 | | | | | |
| | | $d_{16}$ | 0.0913 | $N_{10}$ 1.80518 | $\nu_{10}$ | 25.43 |
| $r_{17}$ | −1.9458 | | | | | |
| | | | Σd = 2.7618 | | | |

TABLE 4

[Embodiment 4]
f = 1, F/2.8, 2ω = 180°, back focal distance 2.261

| Radius of Curvature | | Axial Distance | | Refractive Index | | Abbe Number |
|---|---|---|---|---|---|---|
| $r_1$ | 4.4368 | | | | | |
| | | $d_1$ | 0.1299 | $N_1$ 1.71300 | $\nu_1$ | 53.93 |
| $r_2$ | 0.7709 | | | | | |
| | | $d_2$ | 0.5688 | | | |
| $r_3$ | 1.3528 | | | | | |
| | | $d_3$ | 0.0938 | $N_2$ 1.61800 | $\nu_2$ | 63.38 |
| $r_4$ | 0.7734 | | | | | |
| | | $d_4$ | 0.3313 | | | |
| $r_5$ | 1.3673 | | | | | |
| | | $d_5$ | 0.3588 | $N_3$ 1.59551 | $\nu_3$ | 39.23 |
| $r_6$ | −0.7178 | | | | | |
| | | $d_6$ | 0.0625 | $N_4$ 1.62280 | $\nu_4$ | 56.98 |

TABLE 4-continued

[Embodiment 4]
f = 1, F/2.8, 2ω = 180°, back focal distance 2.261

| Radius of Curvature | | Axial Distance | | Refractive Index | | Abbe Number |
|---|---|---|---|---|---|---|
| $r_7$ | 8.6559 | | | | | |
| | | $d_7$ | 0.2375 | $N_5$ 1.80500 | $\nu_5$ | 40.97 |
| $r_8$ | 14.0377 | | | | | |
| | | $d_8$ | 0.0806 | | | |
| $r_9$ | ∞ (filter) | | | | | |
| | | $d_9$ | 0.0938 | $N_6$ 1.58100 | $\nu_6$ | 41.00 |
| $r_{10}$ | ∞ | | | | | |
| | | $d_{10}$ | 0.1875 | | | |
| $r_{11}$ | −2.8380 | | | | | |
| | | $d_{11}$ | 0.0500 | $N_7$ 1.59551 | $\nu_7$ | 39.23 |
| $r_{12}$ | 1.9923 | | | | | |
| | | $d_{12}$ | 0.2188 | $N_8$ 1.65160 | $\nu_8$ | 58.60 |
| $r_{13}$ | −1.0701 | | | | | |
| | | $d_{13}$ | 0.0063 | | | |
| $r_{14}$ | 3.5704 | | | | | |
| | | $d_{14}$ | 0.2188 | $N_9$ 1.48749 | $\nu_9$ | 70.15 |
| $r_{15}$ | −0.8001 | | | | | |
| | | $d_{15}$ | 0.0625 | $N_{10}$ 1.80518 | $\nu_{10}$ | 25.43 |
| $r_{16}$ | −1.6272 | | | | | |
| | | | Σd = 2.7006 | | | |

TABLE 5

[Embodiment 5]
f = 1, F/2.8, 2ω = 180°, back focal distance 2.204

| Radius of Curvature | | Axial Distance | | Refractive Index | | Abbe Number |
|---|---|---|---|---|---|---|
| $r_1$ | 4.3046 | | | | | |
| | | $d_1$ | 0.1299 | $N_1$ 1.71300 | $\nu_1$ | 53.93 |
| $r_2$ | 0.8034 | | | | | |
| | | $d_2$ | 0.5688 | | | |
| $r_3$ | 1.5151 | | | | | |
| | | $d_3$ | 0.0938 | $N_2$ 1.61800 | $\nu_2$ | 63.38 |
| $r_4$ | 0.8390 | | | | | |
| | | $d_4$ | 0.3313 | | | |
| $r_5$ | 7.0679 | | | | | |
| | | $d_5$ | 0.1250 | $N_3$ 1.80500 | $\nu_3$ | 40.97 |
| $r_6$ | ∞ | | | | | |
| | | $d_6$ | 0.0063 | | | |
| $r_7$ | 2.0927 | | | | | |
| | | $d_7$ | 0.4838 | $N_4$ 1.59270 | $\nu_4$ | 35.29 |
| $r_8$ | −1.5780 | | | | | |
| | | $d_8$ | 0.1875 | $N_5$ 1.60000 | $\nu_5$ | 64.38 |
| $r_9$ | 7.3459 | | | | | |
| | | $d_9$ | 0.0806 | | | |
| $r_{10}$ | ∞ (filter) | | | | | |
| | | $d_{10}$ | 0.0938 | $N_6$ 1.58100 | $\nu_6$ | 41.00 |
| $r_{11}$ | ∞ | | | | | |
| | | $d_{11}$ | 0.2500 | | | |
| $r_{12}$ | −4.7523 | | | | | |
| | | $d_{12}$ | 0.0500 | $N_7$ 1.58144 | $\nu_7$ | 40.83 |
| $r_{13}$ | 1.2959 | | | | | |
| | | $d_{13}$ | 0.2500 | $N_8$ 1.65844 | $\nu_8$ | 50.88 |
| $r_{14}$ | −1.1273 | | | | | |
| | | $d_{14}$ | 0.0063 | | | |
| $r_{15}$ | 3.2103 | | | | | |
| | | $d_{15}$ | 0.3125 | $N_9$ 1.48749 | $\nu_9$ | 70.15 |
| $r_{16}$ | −0.8604 | | | | | |
| | | $d_{16}$ | 0.0913 | $N_{10}$ 1.80518 | $\nu_{10}$ | 25.43 |
| $r_{17}$ | −2.2499 | | | | | |
| | | | Σd = 3.0606 | | | |

The preceding Tables 1–5 disclose five embodiments of the present invention which more than adequately establish the truthfulness of the recited ranges of conditions.

As can be readily appreciated, it is possible to deviate from the above embodiments of the present invention and as will be readily understood by those skilled in the art, the invention is capable of many modifications and improvements within the scope and spirit thereof. Accordingly, it will be understood that the invention is not limited by the specific disclosed embodiments, but only by the scope and spirit of the appended claims.

I claim:

1. A fish eye lens system comprising:
   a front lens group consisting of a pair of negative meniscus lens elements both convex to the object side;
   an intermediate lens group consisting of a pair of positive lens elements and a negative lens element; and
   a rear lens group consisting of a pair of doublets, the object side one of which includes an intermediate cemented surface having a positive refractive power.

2. The invention of claim 1, wherein the radius of curvature R of the intermediate cemented surface of the object side doublet in the rear lens group fulfills the following condition wherein f represents the focal length of the whole lens system:
   $f < R < 3f$.

3. The invention of claim 1, wherein the focal length of the front lens group, $f_I$, is defined as follows:
   $2.7f < |f_I| < 3.1f$
   wherein f is the focal length of the whole lens system.

4. The invention of claim 2 further comprising an aperture stop and an exchangeable filter both located between the intermediate and rear lens groups.

5. The invention of claim 2 wherein one of the pair of positive lens elements is cemented to the negative lens element in the intermediate lens group.

6. The invention of claim 3, wherein the focal length of the intermediate lens group, $f_{II}$, is defined as follows:
   $2.6f < f_{II} < 3.1f$.

7. The invention of claim 5, wherein the other of the pair of positive lens elements is located at the image side of the cemented lens elements in the intermediate lens group.

8. The invention of claim 5, wherein the other of the pair of positive lens elements is located at the object side of the cemented lens elements in the intermediate lens group.

9. The invention of claim 5, wherein all of the three lens elements are cemented together in the intermediate lens group.

10. A fish eye lens system comprising:
    an aperture stop;
    a first group of lens elements located at the object side of the aperture stop, including a pair of negative meniscus lens elements consecutively arranged at the front of the lens system; and
    a second group of lens elements located at the image side of the aperture stop including a pair of doublets, the image side one of the doublets including an intermediate cemented surface having a negative refractive power, while the object side one of the doublet being arranged next to the aperture stop and having an intermediate cemented surface fulfilling the following conditions:
    $\phi > 0$
    $f < R < 3f$
    wherein:
    $\phi$ represents the refractive power of the intermediate surface of the object side one of the doublets;
    R represents the radius of curvature of the intermediate surface of the object side one of the doublets; and
    f represents the focal length of the whole lens system.

11. An improved fish eye lens system comprising the following design parameters:

| f = 1, F/2.8, 2ω = 180°, back focal distance 2.324 | | | | | | | |
|---|---|---|---|---|---|---|---|
| Radius of Curvature | | Axial Distance | | Refractive Index | | Abbe Number | |
| $r_1$ | 4.7745 | | | | | | |
| | | $d_1$ | 0.1299 | $N_1$ | 1.71300 | $\nu_1$ | 53.93 |
| $r_2$ | 0.8821 | | | | | | |
| | | $d_2$ | 0.5688 | | | | |
| $r_3$ | 1.6822 | | | | | | |
| | | $d_3$ | 0.0938 | $N_2$ | 1.61800 | $\nu_2$ | 63.38 |
| $r_4$ | 0.8064 | | | | | | |
| | | $d_4$ | 0.3313 | | | | |
| $r_5$ | 1.6265 | | | | | | |
| | | $d_5$ | 0.4838 | $N_3$ | 1.59551 | $\nu_3$ | 39.23 |
| $r_6$ | −0.7284 | | | | | | |
| | | $d_6$ | 0.0969 | $N_4$ | 1.62280 | $\nu_4$ | 56.98 |
| $r_7$ | 8.3331 | | | | | | |
| | | $d_7$ | 0.0500 | | | | |
| $r_8$ | 7.6334 | | | | | | |
| | | $d_8$ | 0.1875 | $N_5$ | 1.80500 | $\nu_5$ | 40.97 |
| $r_9$ | ∞ | | | | | | |
| | | $d_9$ | 0.0806 | | | | |
| $r_{10}$ | ∞ (filter) | | | | | | |
| | | $d_{10}$ | 0.0938 | $N_6$ | 1.58100 | $\nu_6$ | 41.00 |
| $r_{11}$ | ∞ | | | | | | |
| | | $d_{11}$ | 0.2413 | | | | |
| $r_{12}$ | −2.8724 | | | | | | |
| | | $d_{12}$ | 0.0500 | $N_7$ | 1.59270 | $\nu_7$ | 35.29 |
| $r_{13}$ | 2.8034 | | | | | | |
| | | $d_{13}$ | 0.2500 | $N_8$ | 1.64050 | $\nu_8$ | 60.08 |
| $r_{14}$ | −1.1513 | | | | | | |
| | | $d_{14}$ | 0.0063 | | | | |
| $r_{15}$ | 3.2583 | | | | | | |
| | | $d_{15}$ | 0.2919 | $N_9$ | 1.48749 | $\nu_9$ | 70.15 |
| $r_{16}$ | −0.8827 | | | | | | |
| | | $d_{16}$ | 0.0913 | $N_{10}$ | 1.80518 | $\nu_{10}$ | 25.43 |
| $r_{17}$ | −1.7116 | | | | | | |
| Σd = 3.0468 | | | | | | | |

12. An improved fish eye lens system comprising the following design parameters:

| f = 1, F/2.8, 2ω = 180°, back focal distance 2.29 | | | | | | | |
|---|---|---|---|---|---|---|---|
| Radius of Curvature | | Axial Distance | | Refractive Index | | Abbe Number | |
| $r_1$ | 4.7740 | | | | | | |
| | | $d_1$ | 0.1299 | $N_1$ | 1.71300 | $\nu_1$ | 53.93 |
| $r_2$ | 0.8708 | | | | | | |
| | | $d_2$ | 0.5688 | | | | |
| $r_3$ | 1.6372 | | | | | | |
| | | $d_3$ | 0.0938 | $N_2$ | 1.61800 | $\nu_2$ | 63.38 |
| $r_4$ | 0.8034 | | | | | | |
| | | $d_4$ | 0.3313 | | | | |
| $r_5$ | 1.5933 | | | | | | |
| | | $d_5$ | 0.4838 | $N_3$ | 1.59551 | $\nu_3$ | 39.23 |
| $r_6$ | −0.7261 | | | | | | |
| | | $d_6$ | 0.0969 | $N_4$ | 1.62280 | $\nu_4$ | 56.98 |
| $r_7$ | 8.5127 | | | | | | |
| | | $d_7$ | 0.2375 | $N_5$ | 1.80500 | $\nu_5$ | 40.97 |
| $r_8$ | ∞ | | | | | | |
| | | $d_8$ | 0.0806 | | | | |
| $r_9$ | ∞ (filter) | | | | | | |
| | | $d_9$ | 0.0938 | $N_6$ | 1.58100 | $\nu_6$ | 41.00 |
| $r_{10}$ | ∞ | | | | | | |
| | | $d_{10}$ | 0.2413 | | | | |
| $r_{11}$ | −2.8722 | | | | | | |
| | | $d_{11}$ | 0.0500 | $N_7$ | 1.59551 | $\nu_7$ | 39.23 |
| $r_{12}$ | 1.9923 | | | | | | |
| | | $d_{12}$ | 0.2500 | $N_8$ | 1.65160 | $\nu_8$ | 58.60 |
| $r_{13}$ | −1.1462 | | | | | | |
| | | $d_{13}$ | 0.0063 | | | | |
| $r_{14}$ | 3.3004 | | | | | | |
| | | $d_{14}$ | 0.2919 | $N_9$ | 1.48749 | $\nu_9$ | 70.15 |
| $r_{15}$ | −0.8687 | | | | | | |
| | | $d_{15}$ | 0.0913 | $N_{10}$ | 1.80518 | $\nu_{10}$ | 25.43 |
| $r_{16}$ | −1.7332 | | | | | | |

-continued

| f = 1, F/2.8, 2ω = 180°, back focal distance 2.29 ||||
|---|---|---|---|
| Radius of Curvature | Axial Distance | Refractive Index | Abbe Number |
| Σd = 3.0468 ||||

13. An improved fish eye lens system comprising the following design parameters:

| f = 1, F/2.8, 2ω = 180°, back focal distance 2.213 ||||||||
|---|---|---|---|---|---|---|---|
| Radius of Curvature | | Axial Distance | | Refractive Index | | Abbe Number | |
| $r_1$ | 4.1421 | | | | | | |
| | | $d_1$ | 0.1299 | $N_1$ | 1.71300 | $\nu_1$ | 53.93 |
| $r_2$ | 0.7439 | | | | | | |
| | | $d_2$ | 0.5688 | | | | |
| $r_3$ | 1.4389 | | | | | | |
| | | $d_3$ | 0.0938 | $N_2$ | 1.61800 | $\nu_2$ | 63.38 |
| $r_4$ | 0.7998 | | | | | | |
| | | $d_4$ | 0.3313 | | | | |
| $r_5$ | 7.0679 | | | | | | |
| | | $d_5$ | 0.1250 | $N_3$ | 1.80500 | $\nu_3$ | 40.97 |
| $r_6$ | ∞ | | | | | | |
| | | $d_6$ | 0.0063 | | | | |
| $r_7$ | 1.5149 | | | | | | |
| | | $d_7$ | 0.3588 | $N_4$ | 1.59551 | $\nu_4$ | 39.23 |
| $r_8$ | −0.7304 | | | | | | |
| | | $d_8$ | 0.0969 | $N_5$ | 1.62280 | $\nu_5$ | 56.98 |
| $r_9$ | 4.4030 | | | | | | |
| | | $d_9$ | 0.0806 | | | | |
| $r_{10}$ | ∞ (filter) | | | | | | |
| | | $d_{10}$ | 0.0938 | $N_6$ | 1.58100 | $\nu_6$ | 41.00 |
| $r_{11}$ | ∞ | | | | | | |
| | | $d_{11}$ | 0.1875 | | | | |
| $r_{12}$ | −3.5894 | | | | | | |
| | | $d_{12}$ | 0.0500 | $N_7$ | 1.58144 | $\nu_7$ | 40.83 |
| $r_{13}$ | 1.2959 | | | | | | |
| | | $d_{13}$ | 0.2500 | $N_8$ | 1.63854 | $\nu_8$ | 55.62 |
| $r_{14}$ | −1.0011 | | | | | | |
| | | $d_{14}$ | 0.0063 | | | | |
| $r_{15}$ | 3.1647 | | | | | | |
| | | $d_{15}$ | 0.2919 | $N_9$ | 1.48749 | $\nu_9$ | 70.15 |
| $r_{16}$ | −0.7778 | | | | | | |
| | | $d_{16}$ | 0.0913 | $N_{10}$ | 1.80518 | $\nu_{10}$ | 25.43 |
| $r_{17}$ | −1.9458 | | | | | | |
| Σd = 2.7618 ||||||||

14. An improved fish eye lens system comprising the following design parameters:

| f = 1, F/2.8, 2ω = 180°, back focal distance 2.261 ||||||||
|---|---|---|---|---|---|---|---|
| Radius of Curvature | | Axial Distance | | Refractive Index | | Abbe Number | |
| $r_1$ | 4.4368 | | | | | | |
| | | $d_1$ | 0.1299 | $N_1$ | 1.71300 | $\nu_1$ | 53.93 |
| $r_2$ | 0.7709 | | | | | | |
| | | $d_2$ | 0.5688 | | | | |
| $r_3$ | 1.3528 | | | | | | |
| | | $d_3$ | 0.0938 | $N_2$ | 1.61800 | $\nu_2$ | 63.38 |
| $r_4$ | 0.7734 | | | | | | |
| | | $d_4$ | 0.3313 | | | | |
| $r_5$ | 1.3673 | | | | | | |
| | | $d_5$ | 0.3588 | $N_3$ | 1.59551 | $\nu_3$ | 39.23 |
| $r_6$ | −0.7178 | | | | | | |
| | | $d_6$ | 0.0625 | $N_4$ | 1.62280 | $\nu_4$ | 56.98 |
| $r_7$ | 8.6559 | | | | | | |
| | | $d_7$ | 0.2375 | $N_5$ | 1.80500 | $\nu_5$ | 40.97 |
| $r_8$ | 14.0377 | | | | | | |
| | | $d_8$ | 0.0806 | | | | |
| $r_9$ | ∞ (filter) | | | | | | |
| | | $d_9$ | 0.0938 | $N_6$ | 1.58100 | $\nu_6$ | 41.00 |
| $r_{10}$ | ∞ | | | | | | |
| | | $d_{10}$ | 0.1875 | | | | |
| $r_{11}$ | −2.8380 | | | | | | |
| | | $d_{11}$ | 0.0500 | $N_7$ | 1.59551 | $\nu_7$ | 39.23 |
| $r_{12}$ | 1.9923 | | | | | | |
| | | $d_{12}$ | 0.2188 | $N_8$ | 1.65160 | $\nu_8$ | 58.60 |
| $r_{13}$ | −1.0701 | | | | | | |
| | | $d_{13}$ | 0.0063 | | | | |
| $r_{14}$ | 3.5704 | | | | | | |
| | | $d_{14}$ | 0.2188 | $N_9$ | 1.48749 | $\nu_9$ | 70.15 |
| $r_{15}$ | −0.8001 | | | | | | |
| | | $d_{15}$ | 0.0625 | $N_{10}$ | 1.80518 | $\nu_{10}$ | 25.43 |
| $r_{16}$ | −1.6272 | | | | | | |
| Σd = 2.7006 ||||||||

15. An improved fish eye lens system comprising the following design parameters:

| f = 1, F/2.8, 2ω = 180°, back focal distance 2.204 ||||||||
|---|---|---|---|---|---|---|---|
| Radius of Curvature | | Axial Distance | | Refractive Index | | Abbe Number | |
| $r_1$ | 4.3046 | | | | | | |
| | | $d_1$ | 0.1299 | $N_1$ | 1.71300 | $\nu_1$ | 53.93 |
| $r_2$ | 0.8034 | | | | | | |
| | | $d_2$ | 0.5688 | | | | |
| $r_3$ | 1.5151 | | | | | | |
| | | $d_3$ | 0.0938 | $N_2$ | 1.61800 | $\nu_2$ | 63.38 |
| $r_4$ | 0.8390 | | | | | | |
| | | $d_4$ | 0.3313 | | | | |
| $r_5$ | 7.0679 | | | | | | |
| | | $d_5$ | 0.1250 | $N_3$ | 1.80500 | $\nu_3$ | 40.97 |
| $r_6$ | ∞ | | | | | | |
| | | $d_6$ | 0.0063 | | | | |
| $r_7$ | 2.0927 | | | | | | |
| | | $d_7$ | 0.4838 | $N_4$ | 1.59270 | $\nu_4$ | 35.29 |
| $r_8$ | −1.5780 | | | | | | |
| | | $d_8$ | 0.1875 | $N_5$ | 1.60000 | $\nu_5$ | 64.38 |
| $r_9$ | 7.3459 | | | | | | |
| | | $d_9$ | 0.0806 | | | | |
| $r_{10}$ | ∞ (filter) | | | | | | |
| | | $d_{10}$ | 0.0938 | $N_6$ | 1.58100 | $\nu_6$ | 41.00 |
| $r_{11}$ | ∞ | | | | | | |
| | | $d_{11}$ | 0.2500 | | | | |
| $r_{12}$ | −4.7523 | | | | | | |
| | | $d_{12}$ | 0.0500 | $N_7$ | 1.58144 | $\nu_7$ | 40.83 |
| $r_{13}$ | 1.2959 | | | | | | |
| | | $d_{13}$ | 0.2500 | $N_8$ | 1.65844 | $\nu_8$ | 50.88 |
| $r_{14}$ | −1.1273 | | | | | | |
| | | $d_{14}$ | 0.0063 | | | | |
| $r_{15}$ | 3.2103 | | | | | | |
| | | $d_{15}$ | 0.3125 | $N_9$ | 1.48749 | $\nu_9$ | 70.15 |
| $r_{16}$ | −0.8604 | | | | | | |
| | | $d_{16}$ | 0.0913 | $N_{10}$ | 1.80518 | $\nu_{10}$ | 25.43 |
| $r_{17}$ | −2.2499 | | | | | | |
| Σd = 3.0606 ||||||||

* * * * *